United States Patent
Kass et al.

(10) Patent No.: US 8,406,518 B2
(45) Date of Patent: Mar. 26, 2013

(54) SMOOTHED LOCAL HISTOGRAM FILTERS FOR COMPUTER GRAPHICS

(75) Inventors: Michael Kass, Berkeley, CA (US); Justin Solomon, Oakton, VA (US); Rick Sayre, Kensington, CA (US)

(73) Assignee: Pixar, Emeryville, CA (US)

( * ) Notice: Subject to any disclaimer, the term of this patent is extended or adjusted under 35 U.S.C. 154(b) by 941 days.

(21) Appl. No.: 12/493,207

(22) Filed: Jun. 28, 2009

(65) Prior Publication Data

US 2010/0310168 A1 Dec. 9, 2010

Related U.S. Application Data

(60) Provisional application No. 61/145,966, filed on Jan. 20, 2009.

(51) Int. Cl.
*G06K 9/00* (2006.01)
(52) U.S. Cl. ........................................................ 382/168
(58) Field of Classification Search .................... None
See application file for complete search history.

(56) References Cited

U.S. PATENT DOCUMENTS

| | | | |
|---|---|---|---|
| 6,172,354 B1 | 1/2001 | Adan et al. | |
| 6,263,088 B1 | 7/2001 | Crabtree et al. | |
| 7,203,337 B2 * | 4/2007 | Heyden | 382/103 |
| 7,983,502 B2 * | 7/2011 | Cohen et al. | 382/254 |
| 2003/0095627 A1 * | 5/2003 | Anderton | 378/98.7 |
| 2003/0174889 A1 * | 9/2003 | Comaniciu et al. | 382/173 |
| 2004/0037465 A1 | 2/2004 | Krause | |
| 2004/0130680 A1 | 7/2004 | Zhou et al. | |
| 2005/0036658 A1 | 2/2005 | Gibbins et al. | |
| 2007/0136285 A1 | 6/2007 | Cormode et al. | |

OTHER PUBLICATIONS

Perreault et al "Median filtering in constant time" IEEE Transactions on Image Processing 2007.*

* cited by examiner

*Primary Examiner* — Chan S Park
*Assistant Examiner* — Sean Motsinger
(74) *Attorney, Agent, or Firm* — Kilpatrick Townsend & Stockton LLP

(57) ABSTRACT

Local histogram and local histogram-based functions can be determined by generating offset-kernel images based on domain-shifted tonal filter kernels. The offset-kernel images can be reused for multiple image locations and/or local neighborhood sizes, shapes, and weights. A neighborhood filter representing the desired local neighborhood size, shape, and frequency domain characteristics is applied to each of the offset-kernel images. Neighborhood filters may include a temporal dimension for evaluating neighborhoods in space and time. Neighborhood filtered offset-kernel images' values represent samples of local histogram or local histogram-based function corresponding with the domains of their associated domain-shifted tonal filter kernels. Arbitrary functions may be used as tonal filter kernels. A histogram kernel may be used to sample values of local histogram functions. A tonal filter kernel that is a derivative or integral of another tonal filter kernel may be used to sample a derivative or integral, respectively, of a function.

35 Claims, 8 Drawing Sheets

SMOOTHED LOCAL HISTOGRAM FILTERS FOR COMPUTER GRAPHICS

CROSS REFERENCE TO RELATED APPLICATIONS

This application is claims priority to U.S. Provisional Patent Application No. 61/145,966, filed Jan. 20, 2009, which is incorporated by reference herein for all purposes. This application is related to U.S. patent application Ser. No. 12/493,208, which is incorporated by reference herein for all purposes.

BACKGROUND

The present invention relates to the field of computer graphics, and in particular to methods and apparatus for analyzing and filtering of still images, video, and other one-dimensional, two-dimensional, three-dimensional, four-dimensional, and higher-dimensional data sets to produce visual effects.

An image histogram specifies the distribution or quantity of colors, tones, intensities, or other scalar, vector, or tuple pixel values in still images or video. An image histogram specifies the number of pixels in an image having a specific color, tone, intensity, or other attribute value, or falling within a specific range of color, tone, intensity, or other attribute values.

Local image histograms contain a great deal of information useful for applications in computer graphics, computer vision and computational photography. A local image histogram specifies the distribution or quantity of values within a specific portion of an image or video, such as within a given distance from a specified pixel, referred to as a pixel's neighborhood. Typically, each pixel in an image may its own local histogram, because each pixel includes a different set of pixels in its respective neighborhood.

Local image histograms contain a great deal of information useful for applications in computer graphics, computer vision and computational photography. Local histograms often show multiple peaks or modes, due to the presence of different surfaces. Separating out the properties of these modes enables sophisticated non-linear image transformations including noise reduction, edge-preserving smoothing, segmentation and stylization.

However, prior techniques for determining a local histogram are computationally difficult and expensive. One prior approach to computing a local histogram is to determine the distribution of pixel values in the neighborhood surrounding a target pixel. However, this approach is computationally expensive for large neighborhoods. For square or rectangular neighborhoods, histogram computations can be accelerated by exploiting the overlap of neighborhoods for adjacent pixels. Unfortunately, square or rectangular neighborhoods have poor signal-processing characteristics and often exhibit clear visual artifacts due to anisotropy.

Moreover, once local histograms around one or more pixels are explicitly determined, many histogram-based operations are nonlinear. This prevents traditional acceleration techniques for large linear filters from being used, further increasing the overall computational expense.

Rather than explicitly determine local histograms around one or more pixels, other prior histogram techniques operate on the histogram indirectly. These prior techniques do not calculate a local histogram for a given pixel. Instead, they attempt to determine or estimate a particular property of attribute of the local histogram. For example, a prior mean-shift technique can identify the nearest local histogram mode, which is the nearest local histogram peak, for a given pixel without directly determining the local histogram for this pixel's neighborhood. However, prior techniques like the mean-shift technique are iterative and require multiple processing passes over the data set before converging to a solution. This increases the required time and computational expense. Moreover, these prior iterative techniques only identify the nearest local histogram mode or nearest local histogram peak. However, there are many applications that would benefit from knowledge of other local histogram modes. Unfortunately, these prior iterative techniques do nothing to identify any other local histogram modes.

BRIEF SUMMARY

An embodiment of the invention enables local histogram and local histogram-based functions to be determined efficiently and in a direct, non-iterative manner. Furthermore, local histogram-based functions and many types of local histogram-based attributes can be determined without explicitly determining the local histogram.

In an embodiment, a set of offset-kernel images are generated by remapping a source image with each one of a set of domain-shifted tonal filter kernels. The set of offset-kernel images can be reused for multiple image locations and/or local neighborhood sizes, shapes, and weights.

To determine a local histogram or local histogram-based function for an image location, an embodiment of the invention applies a neighborhood filter representing the desired local neighborhood size, shape, and frequency domain characteristics to each of the offset-kernel images at the offset image locations corresponding with the image location. Neighborhood filters may include a temporal dimension for evaluating local neighborhoods in both space and time. Each of the neighborhood filtered offset-kernel image values represents a sample of a local histogram or local histogram-based function corresponding with the domain of its associated domain-shifted tonal filter kernel.

Embodiments of the invention may use any arbitrary function as a tonal filter kernel. An embodiment of the invention uses a histogram kernel to determine sampled values of local histogram functions.

Another embodiment of the invention uses a first tonal filter kernel that is a derivative of a second tonal filter kernel. The sampled function determined from the first tonal filter kernel will be equal to the derivative of a second sampled function determined from the second tonal filter kernel. Thus, this embodiment of the invention can determine the derivative of the second sampled function without explicitly determining the second sample function itself.

Similarly, an additional embodiment of the invention uses a first tonal filter kernel that is an integral of a second tonal filter kernel. The sampled function determined from the first tonal filter kernel will be equal to the integral of a second sampled function determined from the second tonal filter kernel. Thus, this embodiment of the invention can determine the integral of the second sampled function without explicitly determining the second sample function itself.

Embodiments of the invention can be applied to identify the number of local histogram modes, their values, their widths and the percentage of the population contained within each histogram mode. For example, an embodiment of a closest mode local histogram filter determines closest local histogram modes using the derivative of a local histogram kernel as an offset-kernel image tonal filter kernel. In another example, an embodiment of a local mean histogram filter determines a local mean value using an integral of a local histogram kernel as the offset-kernel image tonal filter kernel. In still another example, an embodiment of a dominant model filter identifies the local histogram mode having the largest population using both the derivative and the integral of a local histogram kernel as offset-kernel image tonal filter kernels.

BRIEF DESCRIPTION OF THE DRAWINGS

The invention will be described with reference to the drawings, in which.

In the drawings, the use of identical reference numbers indicates identical elements.

DETAILED DESCRIPTION

Figure 1:
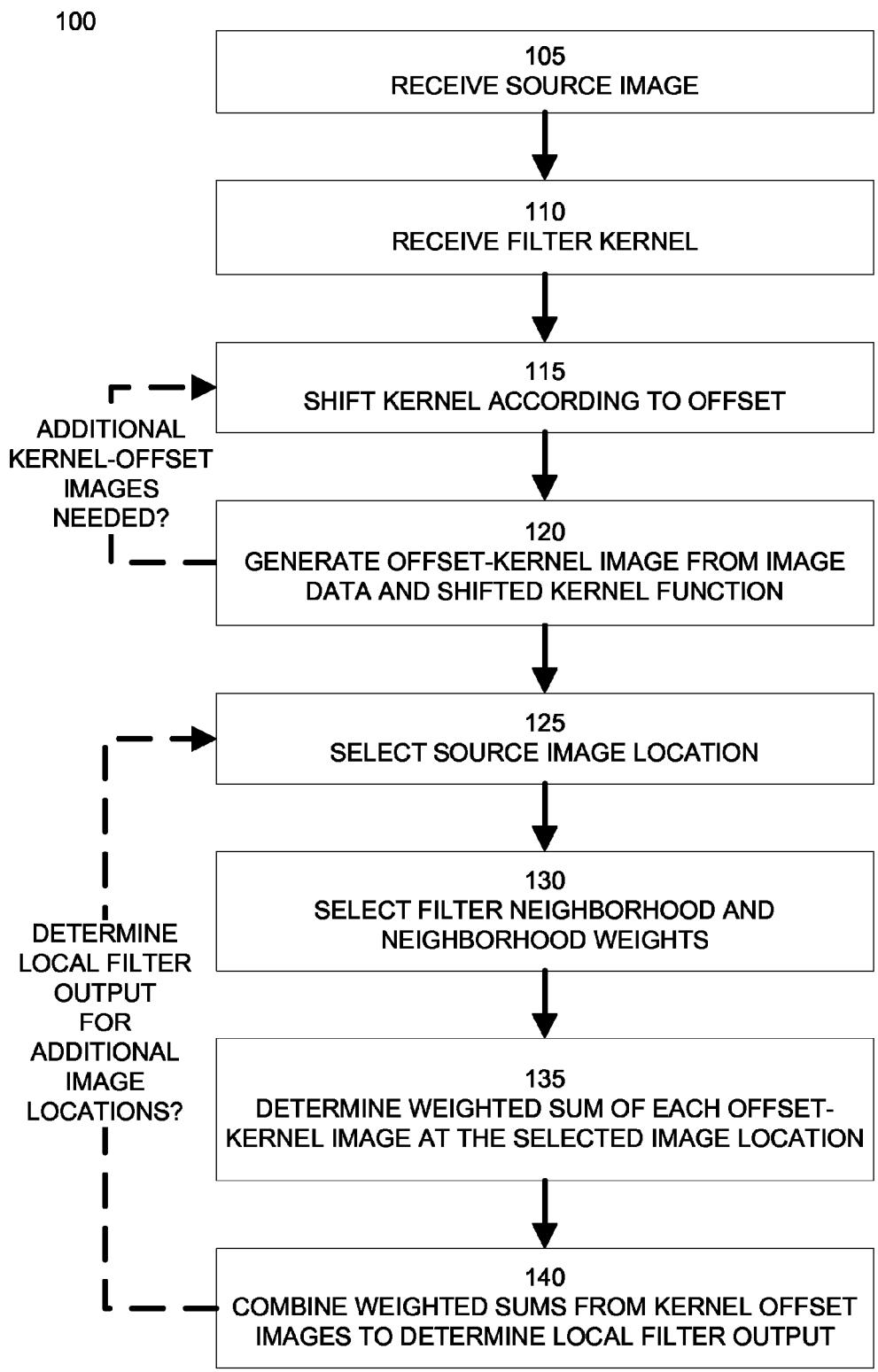
FIG. 1 illustrates a method of computing local histograms and local histogram-based attributes according to an embodiment of the invention.

FIG. 1 illustrates a method 100 of computing local histograms and local histogram-based attributes according to an embodiment of the invention. A global image histogram specifies the distribution or quantity of colors, tones, intensities, or other scalar, vector, or tuple pixel values in still images or video. A global image histogram specifies the number of pixels in a complete image having a specific color, tone, intensity, or other attribute value, or falling within a specific range of color, tone, intensity, or other attribute values. A local image histogram specifies the distribution or quantity of pixel values within a specific portion of an image or video, such as within a given distance from a specified pixel, referred to as a pixel's neighborhood. Typically, each pixel in an image may its own local histogram, because each pixel includes a different set of pixels in its respective neighborhood. Method 100 may be used to determine the values of local histograms and local histogram-based functions, such as the derivatives or integrals of a local histogram.

Step 105 receives a set of image data, referred to as a source image. In this application, the term image is used to describe any type of one-dimensional, two-dimensional, three-dimensional, four-dimensional, or higher-dimensional data set. Examples of image data include still images and other two dimensional data sets, three-dimensional data sets such as video, animation, voxel data sets, and volumetric data structures. One dimension of the image or data set may correspond with time, such as a sequence of two-dimensional images arranged in time (represented as a three-dimensional data set) or a sequence of three dimensional voxel data arranged in time (represented as a four-dimensional data set). Image data may be generated by users using computer graphics content creation software, collected from the physical world using still or video cameras or other two-dimensional or three-dimensional imaging devices.

Each image include a plurality of pixels. In this application, the term pixel is used to describe any data element included in an image. A pixel or data element of an image includes one or more scalar, vector, tuple, or other values. An example of a pixel value is a scalar representing the intensity or other attribute, such as density, of the image at the pixel's location in the image. Another example of a pixel value may be a vector or tuple representing a color in a color space, such as RGB or HSV color space.

Step 110 receives a tonal tonal filter kernel to be used to determine one or more local histograms or local histogram-based attribute values of the image source. As described in detail below, a wide variety of tonal tonal filter kernels may be used to process the image. Embodiments of the invention may use any arbitrary function as a tonal filter kernel to map a pixel value to a corresponding tonal filter kernel function value. In a further embodiment, the tonal filter kernel integrates to a value of one.

Figure 2A:
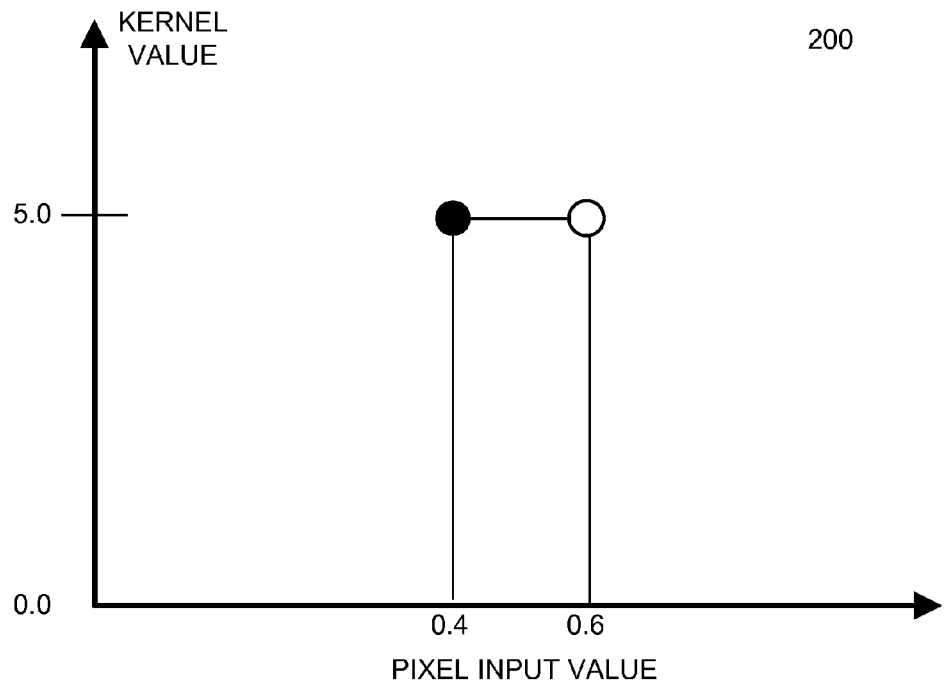
FIGS. 2A-2E illustrate an example application of a method of computing local histograms and local histogram-based attributes according to an embodiment of the invention.

FIG. 2A illustrates a first example tonal filter kernel 200 suitable for use with embodiments of the invention. Tonal filter kernel 200 is a raw histogram intensity function. Tonal filter kernel 200 maps a pixel's scalar value, such as intensity or density, to a tonal filter kernel output value. In this example, tonal filter kernel 200 is centered around a pixel value of 0.5 and outputs a value of 5.0 for any pixel value from 0.4 up to, but not including, 0.6. The tonal filter kernel 200 outputs a value 0.0 for all other pixel values. In this example, the tonal filter kernel 200 integrates, or has an area of, 1.0.

Returning to method 100, step 115 shifts the domain of the tonal filter kernel function according an offset. In an embodiment, the shifted tonal filter kernel is identical to the original tonal filter kernel, but centered around a different pixel value. For example, tonal filter kernel 200 may be shifted to be centered around a pixel value of 0.1. In this example, the shifted tonal filter kernel outputs a value of 5.0 for any pixel value from 0.0 up to, but not including, 0.2 and a value 0.0 for all other pixel values.

Step 120 generates an offset-kernel image from the received image data and the shifted kernel image. Each pixel of an offset-kernel image is generated by mapping the corresponding pixel of the received image data according to the shifted kernel function.

Figure 2B:
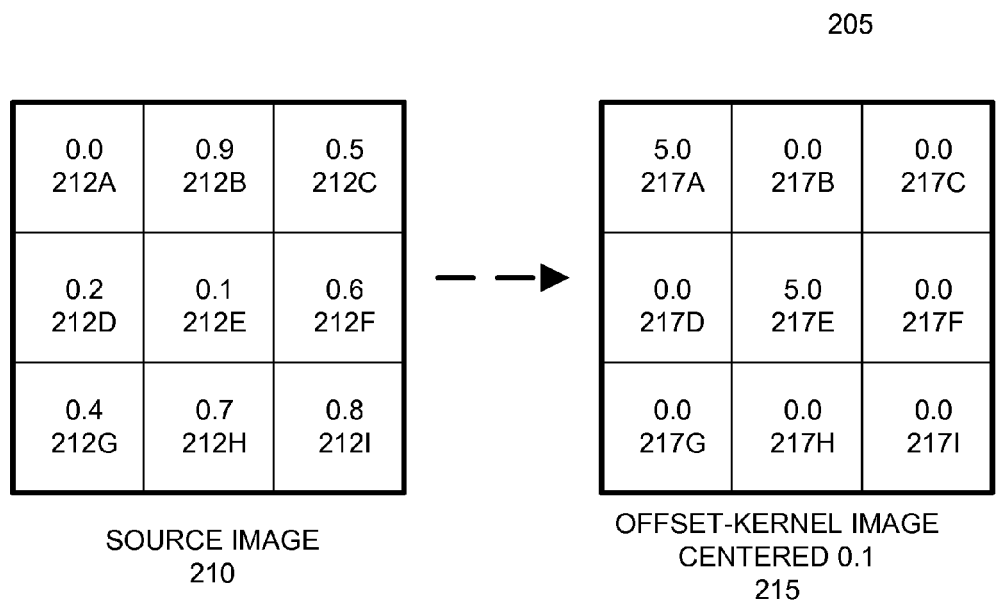

FIG. 2B illustrates an example 205 of the generation of an offset-kernel image from a received source image 210. In example 205, the kernel function 200 is shifted to be centered around a pixel value of 0.1, such that the shifted kernel function outputs a value of 5.0 for any pixel value from 0.0 up to, but not including, 0.2 and a value 0.0 for all other pixel values. Applying this shifted tonal filter kernel to each of the pixel values of the source image 210 results in the offset-kernel image 215.

Comparing the pixel values of the source image 210 with their corresponding values in offset-kernel image 215, source image pixels 212A and 212E, having values of 0.0 and 0.1 respectively, correspond with offset-kernel image pixels 217A and 212E, which are set to a value of 5 by the shifted tonal filter kernel. The remaining source image pixels 212B-212D and 212F-212I correspond with offset-kernel image pixels 217B-217D and 217F-217I set to a value of 0.0 by the shifted tonal filter kernel.

Returning to method 100, steps 115 and 120 may be repeated to generate one or more additional offset-kernel images, each based on the tonal filter kernel shifted by a different amount. Additionally, the unshifted tonal filter kernel may be used to generate one of the offset-kernel images. Embodiments of steps 115 and 120 may generate multiple offset-kernel images in parallel or in series.

As discussed in detail below, each offset-kernel image is used to generate a sample of the local histogram or local histogram-based function for one or more pixels in the source image. Because of this, embodiments of the invention may use any arbitrary number of shifted tonal filter kernels to generate corresponding offset-kernel images, allowing the local histogram or local histogram-based function to be sampled at any desired resolution. Further embodiments of the invention may generate sufficient numbers of offset-kernel images to sample the local histogram or local histogram-based function at or above the Nyquist sampling rate limit.

Embodiments of the invention may set the width of the tonal filter kernel, the number shifted tonal filter kernels evaluated, and the location of the shifted tonal filter kernels to sample all or a fraction of the possible values of pixels at any desired resolution. Additionally, shifted tonal filter kernels may partially overlap. In a further embodiment, the shape of the tonal filter kernel may vary at the boundaries of the domain. For example, changing the shape of the tonal filter kernel prevents the area of the tonal filter kernel from decreasing as a result of being clipped at the boundary of the domain, which would bias the resulting local histogram or local histogram-based function against pixel values near domain boundaries, such as pixel values near 0 or 1 in the above example. In another example, if the pixel value domain is circular, (e.g. representing an angle or hue in an HSV color space), then the shifted tonal filter kernel may wrap at the domain boundaries.

Figure 2C:
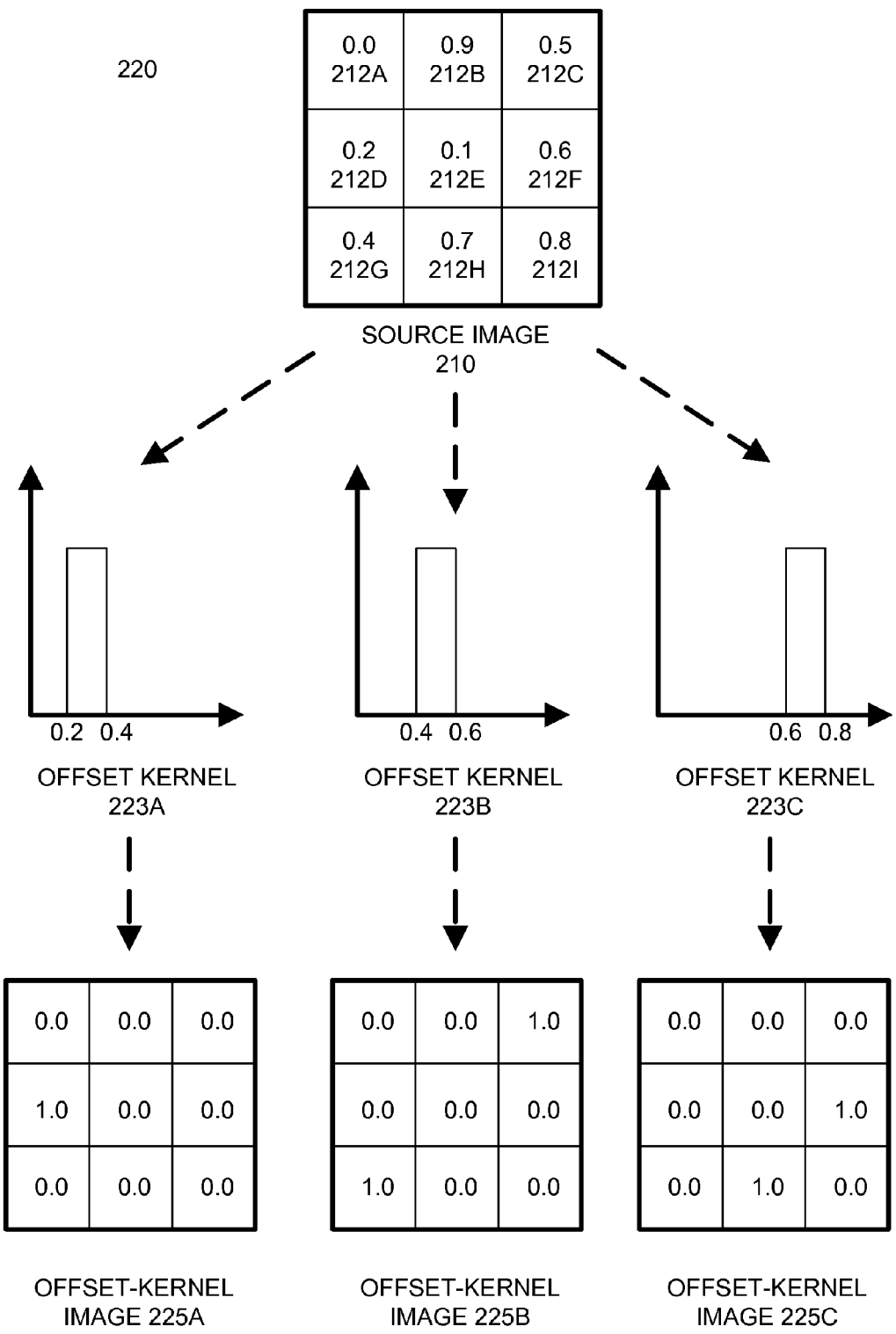

FIG. 2C illustrates an example 220 for determining multiple additional offset-kernel images according to an embodiment of the invention. In this example 220, a source image 210 is processed by a plurality of different shifted kernels 223, including shifted kernel 223A associated with the pixel values between 0.2 and 0.4, shifted kernel 223B associated with the pixel values between 0.4 and 0.6, and shifted kernel 223D associated with the pixel values between 0.6 and 0.8. The shifted kernels 223 generate corresponding offset-kernel images 225, including offset-kernel images 225A, 225B, and 225C, corresponding with shifted kernels 223A, 223B, and 223C.

Following step 120, method 100 determines the sampled local histogram or local histogram-based function for one or more source image pixels based on the set of offset-kernel images generated by steps 105 to 120. This set of offset-kernel images can be reused to determine the sampled local histogram or local histogram-based function for multiple source image pixels and/or for multiple neighborhoods of any arbitrary shape and size.

Step 125 selects a source image location for processing. The source image location may correspond with a single pixel in the source image or may be between two or more pixels. In the case of the latter, linear or non-linear interpolation may be used to determine one or more sub-pixel values in the source image and/or offset-kernel images for the selected source image location. Step 125 may select source image pixels based on instructions from a user or an application. In an embodiment, multiple iterations of step 125 are used to select and process all or a portion of the pixels of the source image.

Step 130 select a neighborhood filter size and neighborhood weights. Embodiments of step 130 can be used to generate sampled local histogram or local histogram-based function for any arbitrary size and shape neighborhood around the selected source pixel. The size and shape of the neighborhood filter can be used to control the aesthetics or other characteristics of the results. Embodiments of step 130 may select the neighborhood filter size and neighborhood weights based on instructions from a user or an application.

In an embodiment, a circular or radially symmetric neighborhood is selected by step 130 to avoid anisotropic visual artifacts. However, other embodiments of the invention may use asymmetrical neighborhoods for emphasis in a particular direction. Further embodiments of the neighborhood filter may alter frequency spectrum of pixel data. For example, the neighborhood filter may include a low-pass filter, a high-pass filter, a band-pass filter, or filters with other frequency domain characteristics.

Step 130 may define the filter neighborhood as a function with a set of weight values. Non-zero weight values in the function specify neighboring pixels within the filter neighborhood. Conversely, zero weight values in the function specify neighboring pixels outside the filter neighborhood. Additionally, an embodiment of the invention may have the influence of nearby pixels fall off gradually with distance. For this, an embodiment of step 130 sets the non-zero weight values in the function to be between one and zero, decreasing in value with distance from the center of the function. In a further embodiment, the function may be defined as an all positive weighting function with unit integral, such as a Gaussian function or distribution. Embodiments of method 100 may implement the filter neighborhood function discretely as a mask or analytically.

Step 135 determines the weighted sum of each offset-kernel image at the selected image location using the filter neighborhood. In an embodiment, step 135 selects one of the offset-kernel images. Step 135 then centers the filter neighborhood function at the image location of the offset-kernel image corresponding with the selected image location of the source image. Step 135 determines a weighted sum or a convolution of the neighborhood filter function with the selected offset-kernel image. The resulting value from this weighted sum represents a sample of the local histogram or histogram-based function.

Figure 2D:
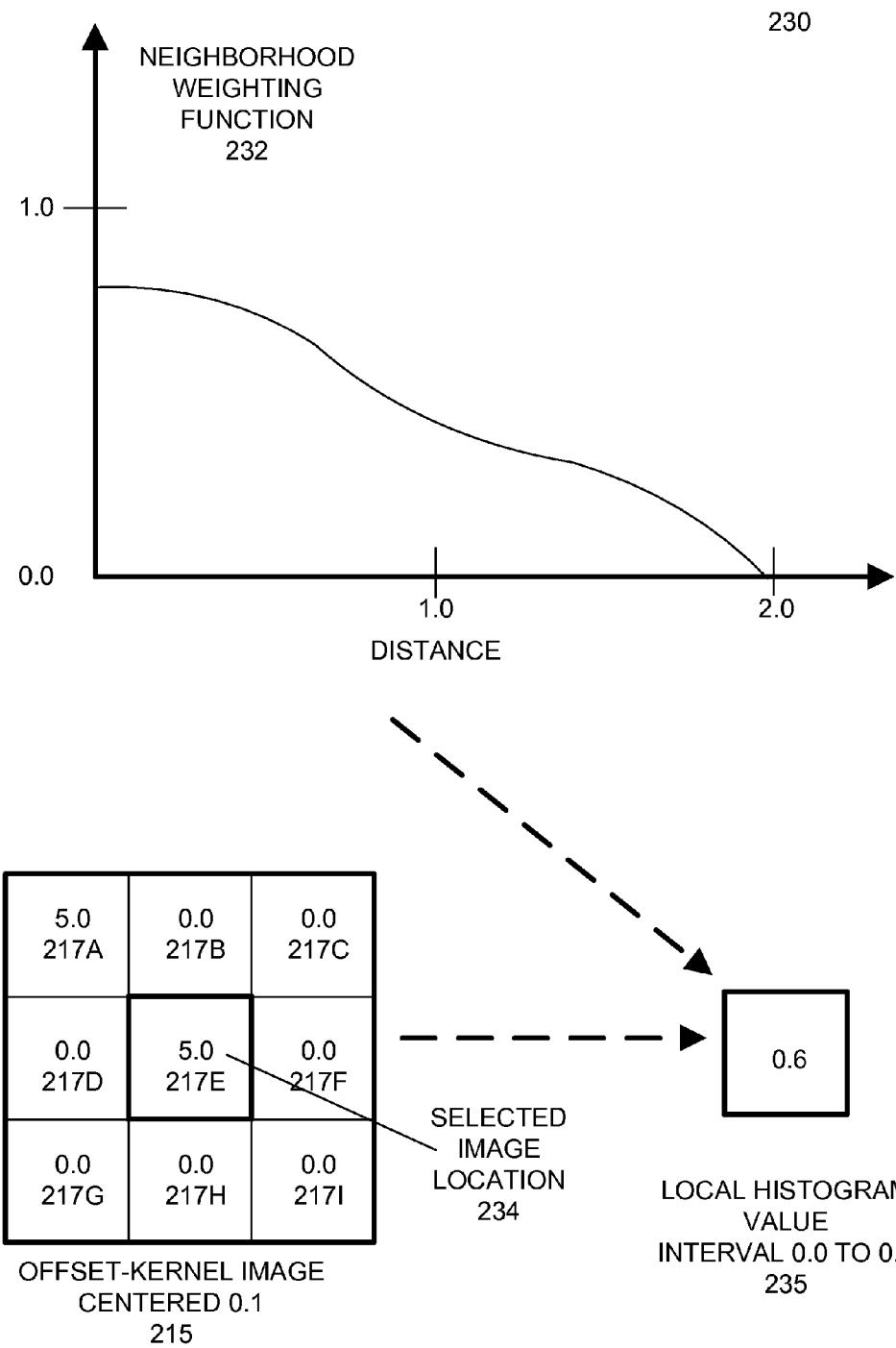

FIG. 2D illustrates an example 230 that determines one of the sampled values of the local histogram or histogram-based function for a selected source image pixel and a filter neighborhood. Example 230 includes a neighborhood weighting function 232 specifying weight values for neighboring offset-kernel image pixels based on their distance from the selected pixel in the offset-kernel image. For example neighborhood weighting function 232, the weight decreases as a function of distance from the selected pixel. Additionally, example neighborhood weighting function 232 is radially symmetric.

Applying the example neighborhood weighting function 232 to the neighborhood surrounding selected pixel 234 in the offset-kernel image 215, corresponding with the selected pixel in the source image, the weighted sum or convolution is equal to 0.7. This value is the local histogram sample value 235 for the interval of pixel input values between 0.0 and 0.2, which is the domain of the shifted tonal filter kernel used to generate offset-kernel image for the selected pixel.

Returning to method 100, embodiments of step 135 may repeat this evaluation for all or a portion of the other offset-kernel images, resulting in a set of samples of the local histogram or histogram-based function. Step 140 combines the values determined from the local neighborhoods of the offset-kernel images to determine a local histogram or local histogram-based function output. In an embodiment, each offset-kernel image can be evaluated with respect to the filter neighborhood for the selected pixel to determine one sample of the local histogram or histogram-based function. Each sample represents the value of the local histogram or histogram-based function at the pixel input value associated with the shifted kernel used to generate its offset-kernel image.

Figure 2E:
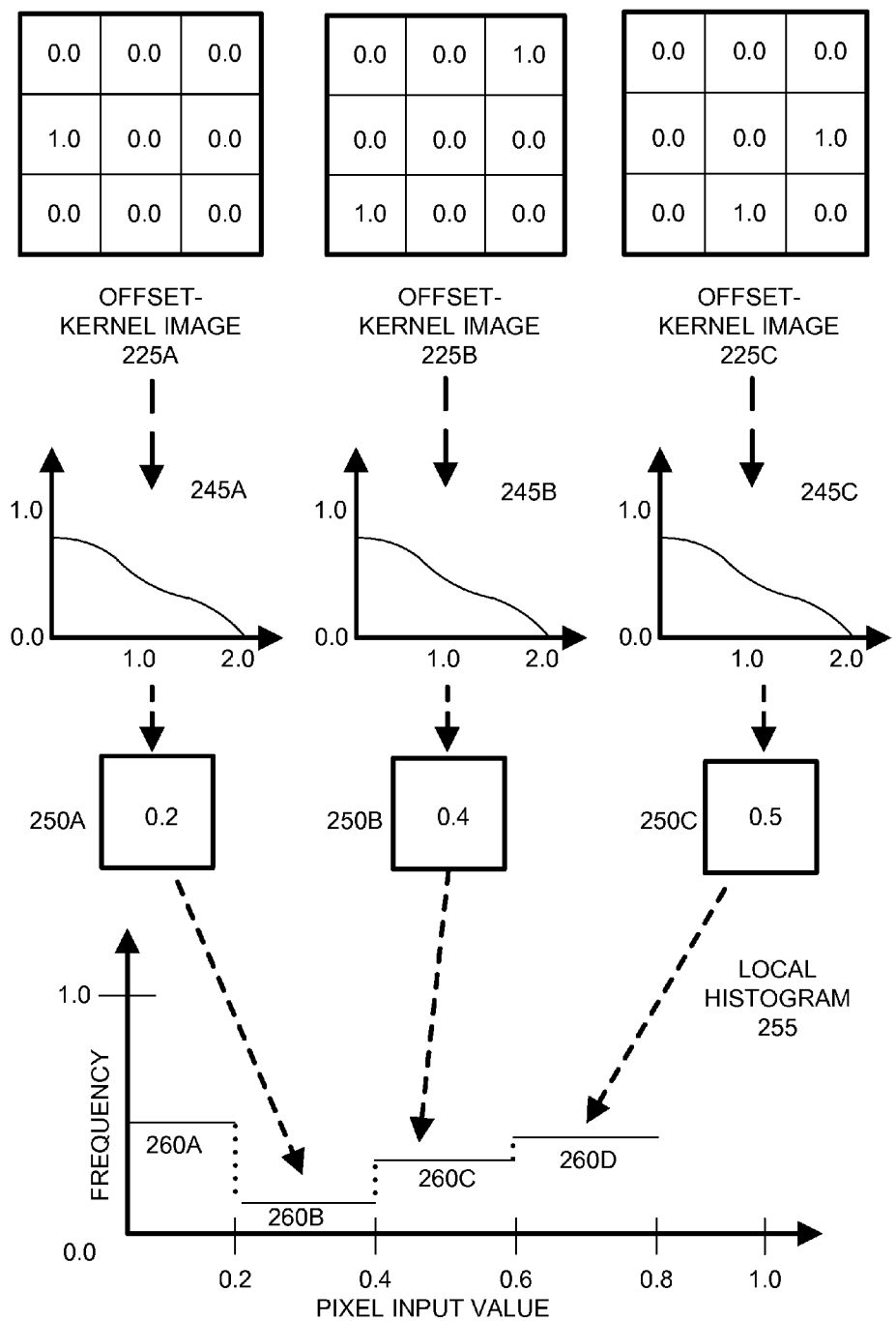

FIG. 2E illustrates an example 240 that determines additional sample values of the local histogram or local histogram-based function. Offset-kernel images 225A, 225B, and 225 are convolved with neighborhood weighting functions 245A, 245B, and 245C, respectively. Neighborhood weighting functions 245 may be identical or different for each offset-kernel image.

The results of each offset-kernel image's 225 convolution with its respective neighborhood weighting function 245 are samples 250 of the local histogram for the selected image pixel. The set of samples 250 can be used to determine a representation of the complete local histogram or histogram-based function, such as local histogram 255.

In example 240, sample 250A specifies the value 260B of the local histogram 255 over the interval between 0.2 and 0.4. Similarly, sample 250B specifies the value 260C of the local histogram 255 over the interval between 0.4 and 0.6, and sample 250C specifies the value 260D of the local histogram 255 over the interval between 0.6 and 0.8. Additionally, the local histogram value 235, shown in FIG. 2D, specifies the value 260A of the local histogram 255 over the interval between 0.0 and 0.2.

Embodiments of step 140 may output the entire local histogram or histogram-based function. Further embodiments of step 140 interpolate between the samples of the local histogram or histogram-based function to determine values between samples. Embodiments of step 140 may use interpolation and other techniques on the local histogram or histogram-based function to find pixel input values corresponding with peaks, valleys, or zero-crossings of the local histogram or histogram-based function.

Steps 125 to 140 may be repeated to determine local histogram or histogram-based function values for additional pixels of the source image and/or for additional neighborhood shapes and sizes. In a further embodiment, all or a portion of steps 125 to 140 may be executed in parallel for two or more pixels to determine their respective local histograms or histogram-based functions.

Figure 3A:
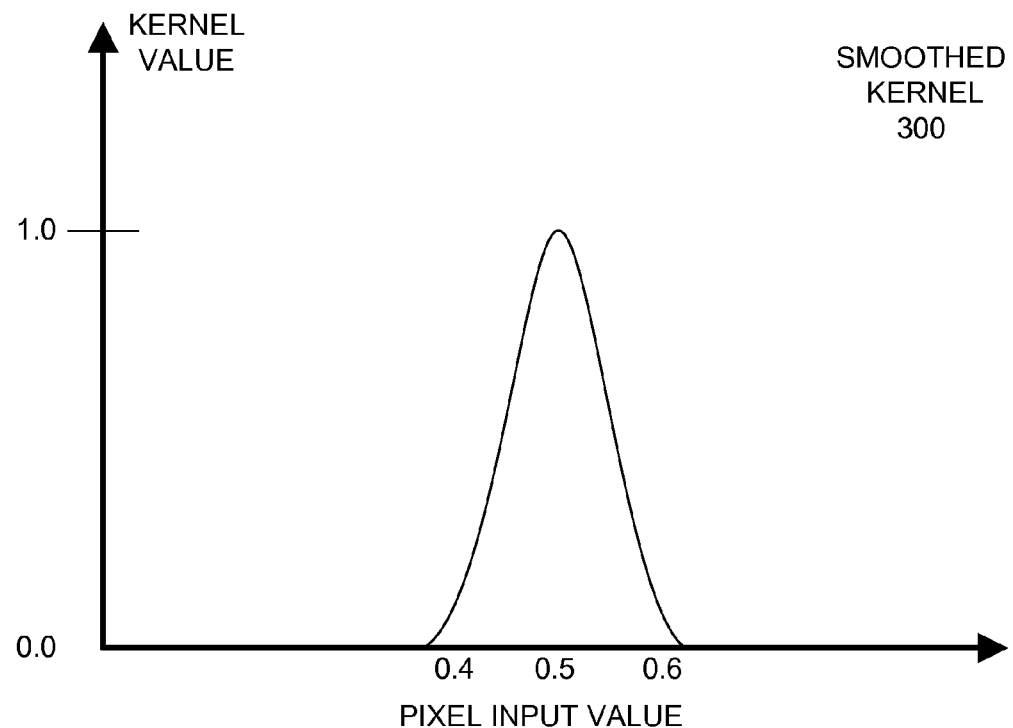
FIG. 3A-3C illustrate additional example tonal kernels suitable for use with embodiments of the invention.
Figure 3B:
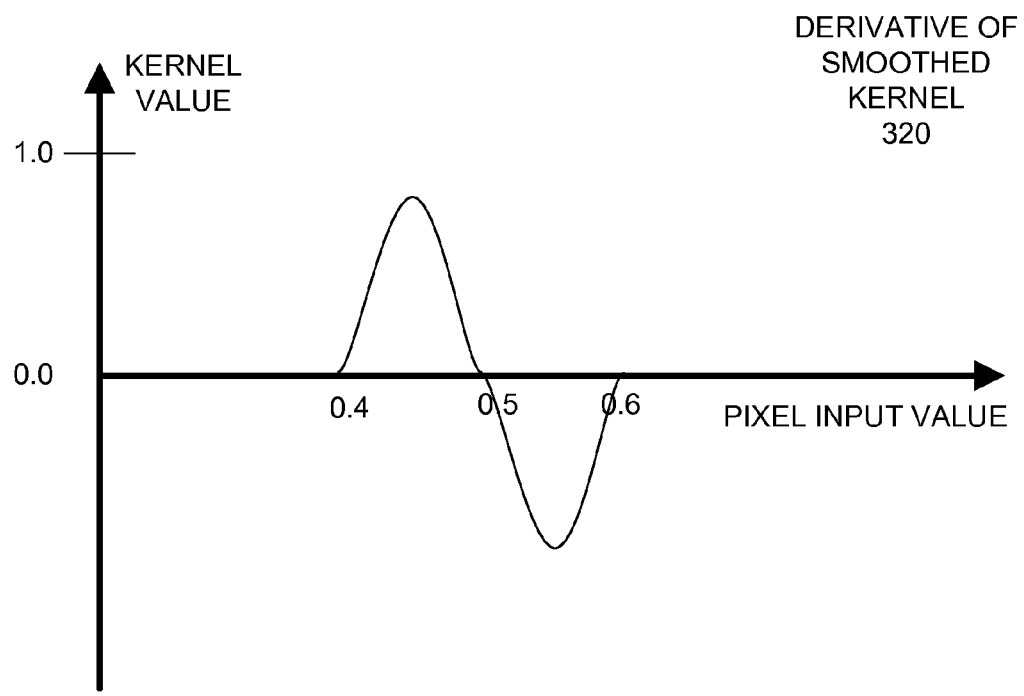
Figure 3C:
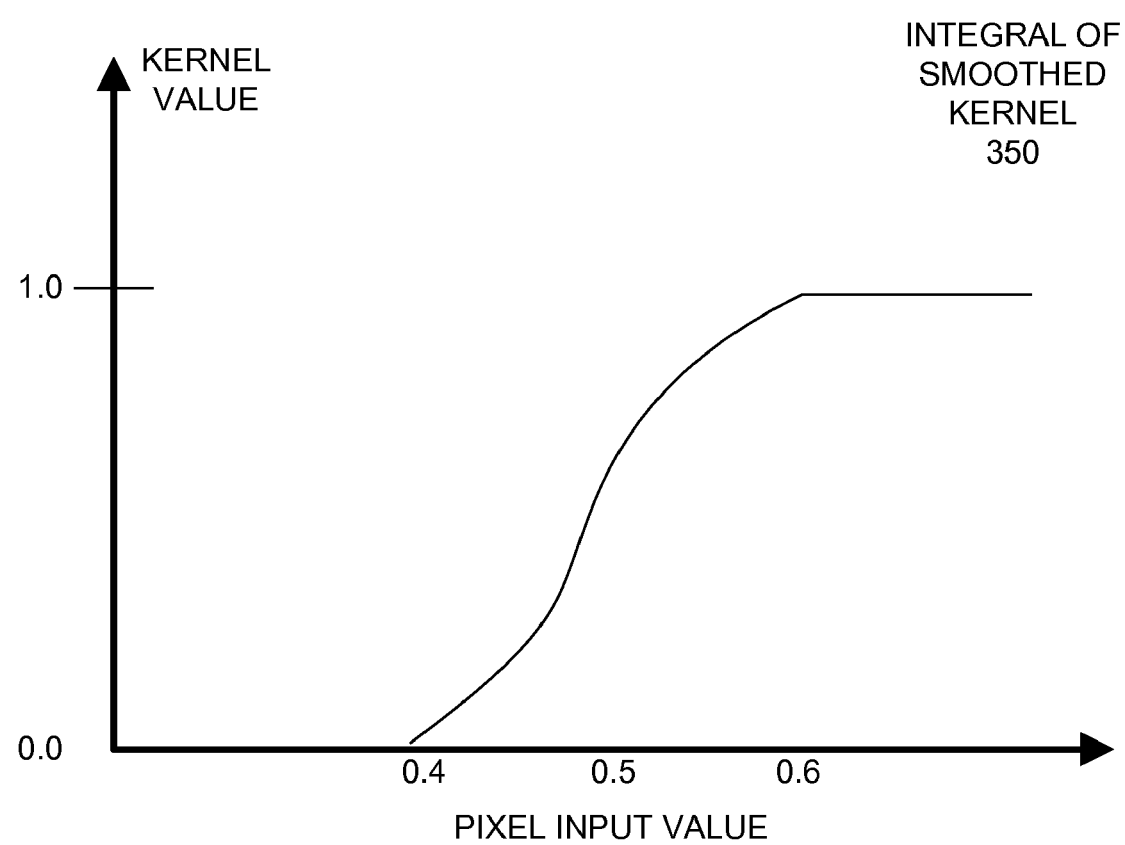

Embodiments of method 100 may be used to determine sampled values of many types of local histogram and histogram-based functions. For example, using method 100 with the tonal filter kernel 200 shown in FIG. 2A will result in sample values of a local raw histogram. FIG. 3A-3C illustrate additional example tonal filter kernels suitable for use with embodiments of the invention. FIG. 3A illustrates an example smoothed tonal filter kernel 300. In an embodiment, the smoothed tonal filter kernel 300 may be a Gaussian distribution or function that integrates to one. Using method 100 with the tonal filter kernel 300 shown in FIG. 3A will result in sampled values of a local smoothed histogram function. Further embodiments of the invention may use any other type of tonal filter kernel, including tonal filter kernels having low-pass filtering characteristics.

FIG. 3B illustrates an example derivative tonal filter kernel 320. The derivative tonal filter kernel 320 is determined from the derivative of a tonal filter kernel, such as smoothed tonal filter kernel 300. Using method 100 with the tonal filter kernel 320 will result in sample values of the derivative of the local smoothed histogram. In general, if using method 100 with an arbitrary tonal filter kernel K results in the sampled version of a local histogram-based function F, then using method 100 with the derivative of this tonal filter kernel K' will result in the sampled version of the derivative of the local histogram-based function (i.e. F'). As discussed below, using a derivative of a tonal filter kernel, such as the derivative 320 of the smoothed tonal filter kernel 300, can be used to find the peaks or histogram modes of the local histogram function.

FIG. 3C illustrates an example integral tonal filter kernel 350. The integral tonal filter kernel 350 is determined by integrating smoothed tonal filter kernel 300. In general, if using method 100 with an arbitrary tonal filter kernel results in the sampled version of a local histogram-based function F, then using method 100 with the integral of this tonal filter kernel ∫K will result in the sampled version of the integral of the local histogram-based function (i.e. ∫F). Using method 100 with the tonal filter kernel 350 will result in sample values of the integral of the local smoothed histogram. As discussed below, using an integral of a tonal filter kernel, such as the integral 350 of the smoothed tonal filter kernel 300, can be used to find the properties such as the median value of the local histogram function for a specified image pixel and its neighborhood.

In an embodiment, the integral tonal filter kernel 350 may be generalized to a moment filter kernel that may be used to determine moments of any order for a local histogram-based function F. Given an initial tonal filter kernel $K(x)$, the moment of order n centered around an input value c may be defined as $$M_n = \int_{-\infty}^{\infty} (x-c)^n K(x) dx.$$

Using this definition, an integral tonal filter kernel 350 is the 0th order moment of an initial tonal filter kernel, such as the smoothed tonal filter kernel 300. Similarly, additional tonal filter kernels may be derived by taking higher order moments of an initial tonal filter kernel.

The local histogram function provides a great deal of information about the neighborhood surrounding pixels in an image. If the local histogram has a single peak or mode, then it is likely that the pixels in the neighborhood come from a similar origin. On the other hand, if the histogram has multiple modes, then the neighborhood probably contains pixels from two or more distinct populations. For stylization, noise reduction, segmentation and other purposes, it is desirable to identify and characterize the modes. In particular, an embodiment can identify the number of modes, their values, their widths and the percentage of the population contained within each mode.

One embodiment of the invention can identify local histogram modes using method 100 and a histogram tonal filter kernel, such as tonal filter kernels 200 or 300, to determine the local histogram function. Once a sufficient number of samples of the local histogram function are determined, this embodiment of the invention can search the sampled local histogram function for peaks or local histogram modes.

Another embodiment of the invention can identify local histogram modes without directly determining the local histogram. In this embodiment, method 100 and the derivative of a histogram tonal filter kernel are used to determine the derivative of local histogram function. Once a sufficient number of samples of the derivative of the local histogram function are determined, this embodiment of the invention can search the sampled derivative of local histogram function for zero crossings of the derivative function. If there is a negative-going zero crossing between adjacent derivative function samples $D_i(p)$ and $D_{i+1}(p)$, then using interpolation, there is a mode located approximately at $$s = s_i + \frac{D_i(p)}{D_i(p) - D_{i+1}(p)}(s_{i+1} - s_i),$$

where $s_i$ and $s_{i+1}$ are the pixel input values, such as intensities, corresponding with the adjacent derivative function samples. A similar evaluation of positive-going zero crossings can be used to determine the location of valleys or negative extrema of a local histogram function, referred to as local histogram anti-modes.

In an embodiment, a closest-mode filter can be determined in a similar manner. A closest-mode filter identifies the local histogram mode closest to the value of a pixel. For example, if a pixel has a value of 0.4 and the local histogram function for this pixel and its neighborhood includes local histogram modes corresponding with pixel values of 0.5 and 0.1, the closest mode filter will output 0.5 as the closest mode for this pixel value.

In an embodiment, the closest-mode filter is evaluated by determining the derivative of a local histogram function, for example using tonal filter kernel 320. The sampled derivative function is interpolated to determine the derivative value at the selected pixel's value. If this derivative is positive, then the closest-mode filter outputs the first mode greater than the selected pixel's value. Otherwise we output the first mode less than the selected pixel's value.

In a further embodiment, for image processing applications, the closest-mode filter is determined by transforming the original image into HSV space, then closest-mode filtered in the V channel and finally transformed back to RGB. The choice of HSV space for the filtering is to avoid slight misalignments that can arise in the positioning of edges in the different color channels. Additionally, the convolution may be determined hierarchically, so the amount of processing required is independent of the size of the local histogram neighborhood.

Where the input image crosses a mode boundary, the output of the closest-mode filter is discontinuous. When computed with a single sample per pixel, this can result in significant aliasing. To attenuate aliasing artifacts, an embodiment of the invention anti-aliases a source image with oversampling. In this embodiment, the derivative of the local histogram function is determined only once per pixel. However, this embodiment oversamples the original image with bilinear interpolation to determine multiple sub-pixel values. The closest-mode filter is applied to each sub-pixel value and the results are averaged together to yield anti-aliased closest mode value for the selected pixel.

The closest-mode filter is an edge preserving filter, which reduces noise image without blurring sharp edges. Another edge preserving filter is a local median filter. In an embodiment, the technique used for determining the derivative function of a local histogram applies equally well to integrals or further derivatives of the smoothed local histogram ($\hat{f}_p$). For example, let E be the indefinite integral of a tonal filter kernel K. If K is a Gaussian, then E will be a corresponding erf function. An embodiment of the invention estimates the integrals of $\hat{f}_p(s)$ as $R(p)=\int \hat{f}_p(s)ds=E(s-I_p) \otimes W$ using the functions $R_i(p)=E(I_p-s_i) \otimes W$, where W is the neighborhood weighting and E is the integral of the histogram tonal filter kernel, such as tonal filter kernel 350.

An embodiment of the invention determines the median filter using method 100 and the integral of a tonal filter kernel, such as tonal filter kernel 350, to determine a sampled integral function of the local histogram. This embodiment of the invention then uses interpolation to find an input value corresponding with a sampled integral function value of 0.5 (which is by definition the median).

Further embodiments of the invention may determine input values for other sampled integral function values to determine arbitrary quantiles of image values in a local neighborhood. For example, an embodiment of the invention may use method 100 and an integral of a tonal filter kernel to determine an input value of the sampled integral function corresponding with a sampled integral function value of 0.1. This input value of the sampled integral function represents the 10th percentile (or 1st decile, 100th permillage, etc.) of image values in the local neighborhood. Thus, 10% of the image values in the local neighborhood have locally-weighted values less than or equal to the identified input value of the sampled integral function. Similarly, determining the input value corresponding with a sampled integral function value of 0.9 defines the 90th percentile of locally-weighted image values.

In addition to the local median filter, embodiments of the invention may be used to evaluate a dominant mode filter. The dominant mode filter can be used as an alternative to the local median filter. For example, in some applications, the concept of a median is undefined. For example, angles exist on a circular domain that wraps or repeats every 360 degrees. Because there is no "beginning" or "end" to this domain, the median is undefined in this context.

In an embodiment, the dominant mode filter is determined using method 100 and a derivative of a tonal filter kernel, such as tonal filter kernel 320. Using the resulting sampled derivative function of the local histogram, an embodiment of the invention uses interpolation to find the input values corresponding with the local histogram modes (i.e. negative-going zero crossings) and local histogram anti-modes (i.e. positive-going zero crossings).

An embodiment of the dominant mode filter determines the area of the local histogram function under each identified local histogram mode. In an embodiment, the dominant mode filter uses method 100 and an integral of a tonal filter kernel, such as tonal filter kernel 350, to determine a sampled integral function of the local histogram. For each identified local histogram mode, an embodiment subtracts the value of the sampled integral function of the local histogram at its right-most adjacent anti-mode from the value of the sampled integral function of the local histogram at its left-most adjacent anti-mode. This gives the value of integral function underneath the local histogram mode. The local histogram mode with the largest integral value is the dominant mode. The magnitude and/or the input value corresponding with the dominant mode is then output by the dominant mode filter.

Embodiments of the dominant mode filter can be applied to circular and non-circular domains. However, for circular domains, an embodiment of the dominant mode filter computes the integrals taking into account branch cuts, such as the transition of an angular domain from 359 degrees to 0 degrees. For integrals that span the branch cut, an embodiment of the dominant mode filter determines the integral in two pieces, one on each side of the branch cut.

Like the local median filter, the dominant mode filter removes the noise very effectively. A close examination will also reveal that it produces a sharper output on some edges than the median. This is a common feature of mode filters. At mode boundaries, the dominant mode filter will switch discontinuously from one mode to another, creating an absolutely sharp edge where a somewhat blurred edge may have existed previously. For a smoother result, embodiments of the local median filter, closest-mode filter, dominant mode filter, and any other mode-based filter can be blended together when two modes account for nearly equal fractions of the population (i.e. when two modes have nearly equal magnitudes).

In a variety of computational photography and image processing applications, images are decomposed into a piece-wise-smooth base layer and one or more detail layers. This is done to capture the large scale variations of image intensity in the base layer while putting fine-scale image texture into the detail layers. Depending on the application, the base layer and the detail can then be processed in different ways and recombined. The detail layer or layers then characterize what is left after the base layer is removed, either by subtraction or some-times division. In applications like HDR tone mapping, the detail may be boosted, while in image stylization, the detail may be attenuated.

A key problem with all of these methods is preventing high-contrast large-scale edges from "leaking" into the detail layers, which can cause halos or other artifacts in further processing.

From a statistical point of view, the base layer should contain variations of the mode over the image and the transitions from mode to mode. The detail image should be limited to variation within a single mode. Embodiments of the invention can be applied to make this distinction.

For example, if a pixel has a value between two local histogram modes of nearly equal magnitude, it is very likely that the pixel is a transitional value on the edge between the two modes. In an embodiment, a function C is defined as the ratio of the populations of the most frequent mode to the second most frequent mode. If there is only one mode, C will be infinite. An embodiment of the invention defines a Halo removal function as C−1, which may be scaled and clipped. A detail image may be multiplied by the halo removal function to avoid halo artifacts.

As discussed above, image data can include a dimension representing time, such as a sequence of two-dimensional images arranged in time (represented as a three-dimensional data set) or a sequence of three dimensional voxel data arranged in time (represented as a four-dimensional data set). An embodiment of the invention extends the concept of a local histogram neighborhood to cover not only pixels near a selected pixel in space, but also pixels near the selected pixel in time.

In an embodiment, extending histogram neighborhoods to include time uses a weighting function extending in both space and time, such as a causal temporal weighting function $$W = \frac{1}{\sigma \lambda \sqrt{2\pi}} e^{-x^2/2^{\sigma-\lambda x}}.$$

Another type of causal temporal weighting function is a running average weighting, in which the local histogram function at a given time is weighted and combined with the running average of two or more local histogram functions at previous times. In an embodiment, the temporal weighting function is combined with a spatial weighting function, such as the Gaussian neighborhood weighting function described above.

Convolutions with the weighting function can be done separably in space and time. In an embodiment, spatial portion of the weighting function is implemented as above and a first-order recursive filter, such as the running average filter, is implemented as the temporal component.

Figure 4:
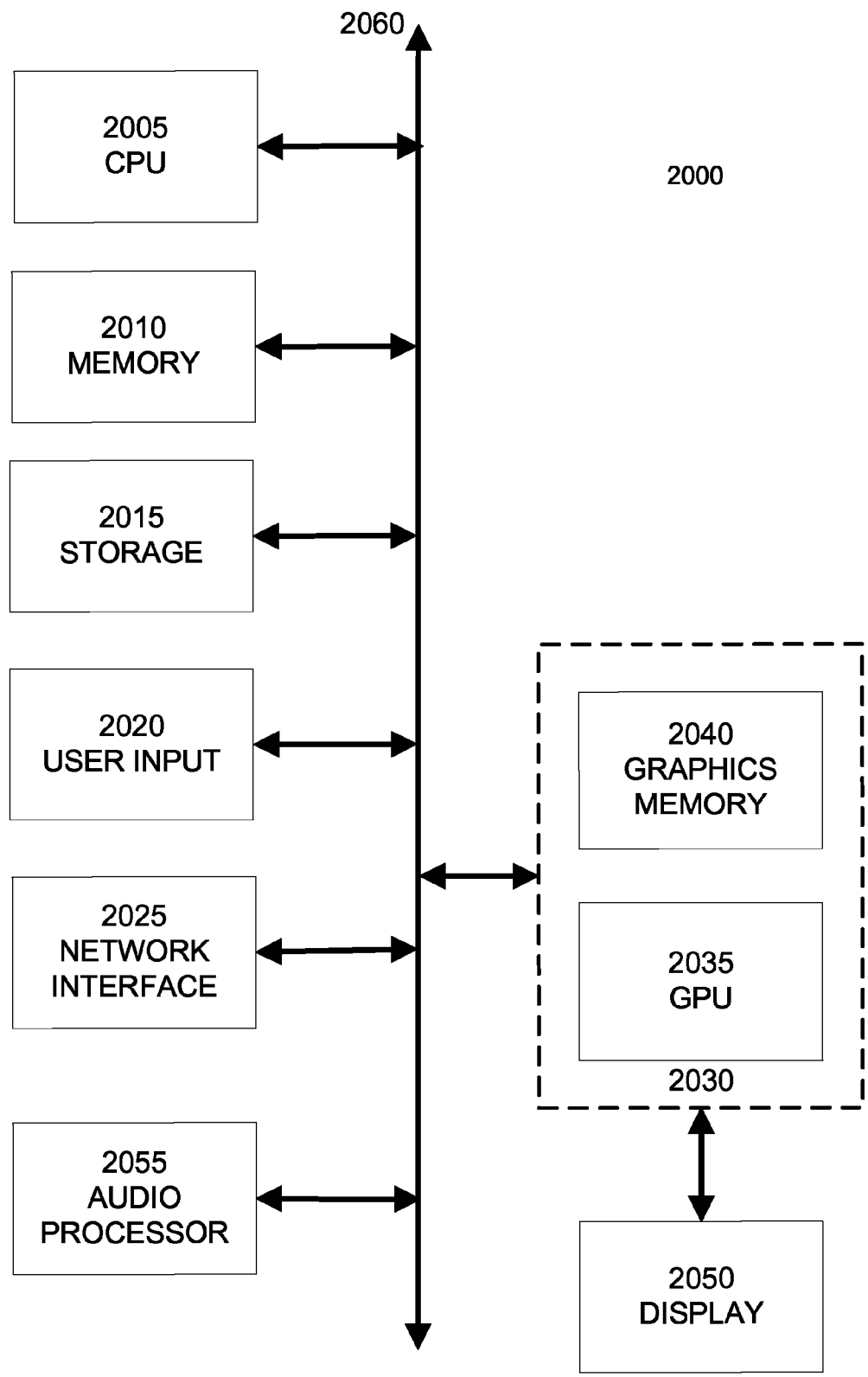
FIG. 4 illustrates a computer system suitable for implementing an embodiment of the invention.

FIG. 4 illustrates a computer system 2000 suitable for implementing an embodiment of the invention. FIG. 4 is a block diagram of a computer system 2000, such as a personal computer, video game console, personal digital assistant, or other digital device, suitable for practicing an embodiment of the invention. Computer system 2000 includes a central processing unit (CPU) 2005 for running software applications and optionally an operating system. CPU 2005 may be comprised of one or more processing cores. Memory 2010 stores applications and data for use by the CPU 2005. Storage 2015 provides non-volatile storage for applications and data and may include fixed or removable hard disk drives, flash memory devices, and CD-ROM, DVD-ROM, Blu-ray, HD-DVD, or other magnetic, optical, or solid state storage devices.

User input devices 2020 communicate user inputs from one or more users to the computer system 2000, examples of which may include keyboards, mice, joysticks, digitizer tablets, touch pads, single or multitouch touch screens, still or video cameras, and/or microphones. Network interface 2025 allows computer system 2000 to communicate with other computer systems via an electronic communications network, and may include wired or wireless communication over local area networks and wide area networks such as the Internet. An audio processor 2055 is adapted to generate analog or digital audio output from instructions and/or data provided by the CPU 2005, memory 2010, and/or storage 2015. The components of computer system 2000, including CPU 2005, memory 2010, data storage 2015, user input devices 2020, network interface 2025, and audio processor 2055 are connected via one or more data buses 2060.

A graphics subsystem 2030 is further connected with data bus 2060 and the components of the computer system 2000. The graphics subsystem 2030 includes at least one graphics processing unit (GPU) 2035 and graphics memory 2040. Graphics memory 2040 includes a display memory (e.g., a frame buffer) used for storing pixel data for each pixel of an output image. Graphics memory 2040 can be integrated in the same device as GPU 2035, connected as a separate device with GPU 2035, and/or implemented within memory 2010.

Pixel data can be provided to graphics memory 2040 directly from the CPU 2005. In some implementations, instructions and/or data representing a scene are provided to renderfarm or set of server computers, each similar to computer system 2000, via the network interface 2025 or storage 2015. The renderfarm generates one or more rendered images of the scene using the provided instructions and/or data. These rendered images are returned to the computer system 2000 for display.

Alternatively, CPU 2005 provides the GPU 2035 with data and/or instructions defining the desired output images, from which the GPU 2035 generates the pixel data of one or more output images. The data and/or instructions defining the desired output images can be stored in memory 2010 and/or graphics memory 2040. In an embodiment, the GPU 2035 includes 3D rendering capabilities for generating pixel data for output images from instructions and data defining the geometry, lighting, shading, texturing, motion, and/or camera parameters for a scene. The GPU 2035 can employ any surface or volume rendering technique known in the art to create one or more rendered images from the provided data and instructions, including rasterization, scanline rendering, REYES or micropolygon rendering, ray casting, ray tracing, image-based rendering techniques, and/or combinations of these and any other rendering or image processing techniques known in the art. The GPU 2035 can further include one or more programmable execution units capable of executing shader programs. GPU 2035 can be comprised of one or more graphics processing unit cores.

The graphics subsystem 2030 periodically outputs pixel data for an image from graphics memory 2040 to be displayed on display device 2050. Display device 2050 is any device capable of displaying visual information in response to a signal from the computer system 2000, including CRT, LCD, plasma, OLED, and SED displays. Computer system 2000 can provide the display device 2050 with an analog or digital signal.

In embodiments of the invention, CPU 2005 is one or more general-purpose microprocessors having one or more homogenous or heterogeneous processing cores. In further embodiments, all or a portion of the graphics subsystem 2030 or GPU 2035 is integrated into CPU 2005.

In an further embodiment, the graphics subsystem 2030 and GPU 2035 may be adapted to perform non-graphics computations, operating as a programmable vector or stream data processing. Parallel programming architectures such as CUDA allow programmers to utilize the GPU 2035 to execute general-purpose algorithms via computational interfaces such as OpenCL and DX11 Compute.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of analyzing an image, the method comprising:
    receiving at least one source image;
    selecting a tonal filter kernel, wherein the tonal filter kernel is at least one derivative of a second tonal filter kernel having a low-pass filtering characteristic;
    generating offset-kernel images from the source image, wherein each of at least a portion of the offset-kernel images are based on applications of domain-shifted tonal filter kernels to the source image;
    selecting an image location; and
    applying a neighborhood filter to the offset-kernel images at offset-kernel image locations corresponding with the image location to determine sampled function values defining a sampled output function.

2. The method of claim 1, wherein the tonal filter kernel is based on a derivative of a histogram kernel.

3. The method of claim 2, wherein the histogram kernel is selected from a group consisting of: a raw histogram kernel and a smoothed histogram kernel.

4. The method of claim 2, wherein the sampled output function is at least one derivative of a local histogram function specifying a distribution of source image value in a neighborhood around the selected image location corresponding with the neighborhood filter.

5. The method of claim 1, wherein the sampled output function is a derivative of a second function associated with the second tonal filter kernel.

6. The method of claim 1, wherein the neighborhood filter includes decreasing weights in at least one dimension in response to increasing distance from a center of the neighborhood filter.

7. The method of claim 1, wherein the neighborhood filter includes at least one temporal dimension.

8. The method of claim 1, wherein applying the neighborhood filter includes:
    interpolating between at least two pixels of the offset-kernel image to determine offset-kernel image values at the offset-kernel image locations corresponding with the image location.

9. The method of claim 1, wherein the source image is selected from a group consisting of:
    a one-dimensional data set; a two-dimensional data set; a three-dimensional data set; and a four-dimensional data set.

10. The method of claim 1, wherein the source image is selected from a group consisting of: a still image; a sequence of still images; animation; video; a voxel data set; a sequence of voxel data sets; a volumetric data set; and a sequence of volumetric data sets.

11. A method of analyzing an image, the method comprising:
    receiving at least one source image;
    selecting a tonal filter kernel, wherein the tonal filter kernel is at least one moment of a second tonal filter kernel having a low-pass filtering characteristic;
    generating offset-kernel images from the source image, wherein each of at least a portion of the offset-kernel images are based on applications of domain-shifted tonal filter kernels to the source image;
    selecting an image location; and
    applying a neighborhood filter to the offset-kernel images at offset-kernel image locations corresponding with the image location to determine sampled function values defining a sampled output function.

12. The method of claim 11, wherein the tonal filter kernel is based on at least one moment of a histogram kernel.

13. The method of claim 12, wherein the histogram kernel is selected from a group consisting of: a raw histogram kernel and a smoothed histogram kernel.

14. The method of claim 12, wherein the sampled output function is a local histogram function specifying a distribution of source image value in a neighborhood around the selected image location corresponding with the neighborhood filter.

15. The method of claim 12, wherein the tonal filter kernel is based the 0th order moment of the histogram kernel.

16. The method of claim 11, wherein the sampled output function is at least one moment of a second function associated with the second tonal filter kernel.

17. The method of claim 11, wherein the neighborhood filter includes decreasing weights in at least one dimension in response to increasing distance from a center of the neighborhood filter.

18. The method of claim 11, wherein the neighborhood filter includes at least one temporal dimension.

19. The method of claim 11, wherein applying the neighborhood filter includes:
    interpolating between at least two pixels of the offset-kernel image to determine offset-kernel image values at the offset-kernel image locations corresponding with the image location.

20. The method of claim 11, wherein the source image is selected from a group consisting of:
    a one-dimensional data set; a two-dimensional data set; a three-dimensional data set; and a four-dimensional data set.

21. The method of claim 11, wherein the source image is selected from a group consisting of: a still image; a sequence of still images; animation; video; a voxel data set; a sequence of voxel data sets; a volumetric data set; and a sequence of volumetric data sets.

22. A method of determining a local histogram mode, the method comprising:
    receiving at least one source image;
    generating offset-kernel images from the source image, wherein each of at least a portion of the offset-kernel images are based on applications of domain-shifted tonal filter kernels to the source image, wherein at least a portion of the domain-shifted tonal filter kernels are derivatives of a histogram tonal filter kernel;

receiving an image location;

applying a neighborhood filter to the offset-kernel images at offset-kernel image locations corresponding with the image location to determine sampled function values defining a sampled derivative function of a local histogram at the image location;

identifying zero crossings of the sampled derivative function; and selecting at least one local histogram mode at the image location based on the identified zero crossings of the sampled derivative function.

23. The method of claim 22, wherein selecting at least one local histogram mode at the image location comprises:

determining a value of the sampled derivative function of the local histogram based on a value of the source image at the image location;

in response to the value of the sampled derivative function of the local histogram being greater than zero, selecting a mode of the local histogram corresponding with a pixel value greater than the value of the source image at the image location; and in response to the value of the sampled derivative function of the local histogram not being greater than zero, selecting a mode of the local histogram corresponding with a pixel value less than the value of the source image at the image location.

24. The method of claim 22, wherein selecting at least one local histogram mode at the image location comprises:

selecting a local histogram mode closest to a value of the source image at the image location.

25. The method of claim 22, wherein the neighborhood filter includes at least one temporal dimension.

26. The method of claim 22, wherein the source image is selected from a group consisting of:

a one-dimensional data set; a two-dimensional data set; a three-dimensional data set; and a four-dimensional data set.

27. The method of claim 22, comprising:

generating second offset-kernel images from the source image based on applications of second domain-shifted tonal filter kernels to the source image, wherein the second domain-shifted tonal filter kernels are integrals of a histogram tonal filter kernel; and applying the neighborhood filter to the second offset-kernel images at second offset-kernel image locations corresponding with the image location to determine second sampled function values defining a sampled integral function of the local histogram at the image location;

wherein selecting at least one local histogram mode at the image location based on the identified zero crossings of the sampled derivative function comprises:

determining local histogram mode magnitudes for the selected local histogram modes from the sampled integral function of the local histogram at the image location; and selecting at least one local histogram mode at the image location based on the local histogram mode magnitudes of the sampled integral function.

28. The method of claim 27, wherein selecting at least one local histogram mode at the image location comprises:

selecting a local histogram mode having the largest magnitude as determined from the sampled integral function as a dominant histogram mode.

29. The method of claim 27, wherein determining the local histogram mode magnitudes comprises:

identifying local histogram anti-modes from the zero crossings of the sampled derivative function; and for each local histogram mode, evaluating an integral of the local histogram at the image location between first and second local histogram anti-modes adjacent to the local histogram mode.

30. The method of claim 22, wherein the domain of values of the image location is circular.

31. The method of claim 22, wherein the domain of values of the image location is non-circular.

32. A method of determining a local quantile of an image location, the method comprising:

receiving at least one source image;

generating offset-kernel images from the source image based on applications of domain-shifted tonal filter kernels to the source image, wherein the second domain-shifted tonal filter kernels are integrals of a Gaussian histogram tonal filter kernel;

receiving an image location;

applying the neighborhood filter to the second offset-kernel images at offset-kernel image locations corresponding with the image location to determine sampled function values defining a sampled integral function of the local histogram at the image location;

receiving a local quantile value; and determining a pixel value corresponding with a value of the sampled integral function of the local histogram equal to the local quantile value.

33. The method of claim 23, wherein the neighborhood filter includes at least one temporal dimension.

34. The method of claim 23, wherein the source image is selected from a group consisting of:

a one-dimensional data set; a two-dimensional data set; a three-dimensional data set; and a four-dimensional data set.

35. The method of claim 22, wherein the local quantile value is equal to 0.5.

* * * * *

UNITED STATES PATENT AND TRADEMARK OFFICE
CERTIFICATE OF CORRECTION

PATENT NO. : 8,406,518 B2  
APPLICATION NO. : 12/493207  
DATED : March 26, 2013  
INVENTOR(S) : Kass et al.

Page 1 of 1

It is certified that error appears in the above-identified patent and that said Letters Patent is hereby corrected as shown below:

In the Claims:

Column 13, Line 36, Claim 1: please delete "are" and insert --is--.

Column 13, Line 50, Claim 4: please delete "value" and insert --values--.

Column 14, Line 19, Claim 11: please delete "are" and insert --is--.

Column 14, Line 33, Claim 14: please delete "value" and insert --values--.

Signed and Sealed this  
Fifteenth Day of October, 2013

Teresa Stanek Rea  
*Deputy Director of the United States Patent and Trademark Office*